(12) United States Patent
Koike

(10) Patent No.: US 12,554,789 B2
(45) Date of Patent: Feb. 17, 2026

(54) WEB BROWSING SYSTEM, SERVER, AND CONTROL METHOD FOR OFFLOADING A BROWSER ENGINE ONTO THE CLOUD

(71) Applicant: CANON KABUSHIKI KAISHA, Tokyo (JP)

(72) Inventor: Hiroaki Koike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 18/464,120

(22) Filed: Sep. 8, 2023

(65) Prior Publication Data
US 2024/0086485 A1 Mar. 14, 2024

(30) Foreign Application Priority Data
Sep. 13, 2022 (JP) .................. 2022-145033

(51) Int. Cl.
*G06F 16/954* (2019.01)
*G06F 16/955* (2019.01)
*G06F 16/957* (2019.01)

(52) U.S. Cl.
CPC .......... *G06F 16/954* (2019.01); *G06F 16/955* (2019.01); *G06F 16/9577* (2019.01)

(58) Field of Classification Search
CPC .. G06F 16/954; G06F 16/955; G06F 16/9577; H04L 67/02
See application file for complete search history.

(56) References Cited

U.S. PATENT DOCUMENTS

| 7,216,177 | B1 * | 5/2007 | Strong | G06F 16/9577 379/900 |
| 9,720,888 | B1 * | 8/2017 | Jain | G06F 16/9577 |
| 10,002,115 | B1 * | 6/2018 | Killian | H04L 47/70 |
| 10,749,926 | B2 * | 8/2020 | Whitt | H04L 67/025 |
| 2002/0015042 | A1 * | 2/2002 | Robotham | G06F 3/1454 345/581 |
| 2006/0048051 | A1 * | 3/2006 | Lazaridis | G06F 16/9577 715/205 |

(Continued)

FOREIGN PATENT DOCUMENTS

JP 2022041717 A 3/2022
WO WO-2022199806 A1 * 9/2022 ......... G06F 16/9574

*Primary Examiner* — Asher D Kells
(74) *Attorney, Agent, or Firm* — Canon U.S.A., Inc. IP Division

(57) ABSTRACT

A web browsing system includes a server configured to render a webpage, and a communication terminal configured to display the webpage based on a result of the rendering, the communication terminal including: a unit configured to transmit, to the server, address information of the webpage and specification information for specifying a display environment of the communication terminal, and a unit configured to receive, from the server, a render image of the webpage rendered based on a rendering condition specified based on the specification information, and the server including: a unit configured to receive the address information and the specification information from the communication terminal, and a unit configured to access the webpage based on the address information, generate the render image from the webpage based on the rendering condition specified based on the specification information, and transmit the render image to the communication terminal.

11 Claims, 13 Drawing Sheets

(56) References Cited

U.S. PATENT DOCUMENTS

| | | | |
|---|---|---|---|
| 2008/0222273 A1* | 9/2008 | Lakshmanan | G06F 16/583 709/219 |
| 2010/0017502 A1* | 1/2010 | Cheng | G06Q 10/107 709/227 |
| 2011/0231782 A1* | 9/2011 | Rohrabaugh | G06F 40/103 715/760 |
| 2012/0250598 A1* | 10/2012 | Lonnfors | H04W 52/0209 370/311 |
| 2012/0265802 A1* | 10/2012 | Shen | H04L 67/02 709/203 |
| 2015/0169509 A1* | 6/2015 | Seshadri | G06F 16/957 715/234 |
| 2015/0293929 A1* | 10/2015 | Namgung | G06F 40/14 715/234 |
| 2015/0296027 A1* | 10/2015 | Bak | H04L 67/148 709/202 |
| 2015/0310126 A1* | 10/2015 | Steiner | G06F 16/9574 715/204 |
| 2015/0312313 A1* | 10/2015 | Whitt | H04L 67/025 709/217 |
| 2018/0032491 A1* | 2/2018 | Heo | G06Q 30/0277 |
| 2018/0157629 A1* | 6/2018 | Tuli | H04L 67/5651 |

* cited by examiner

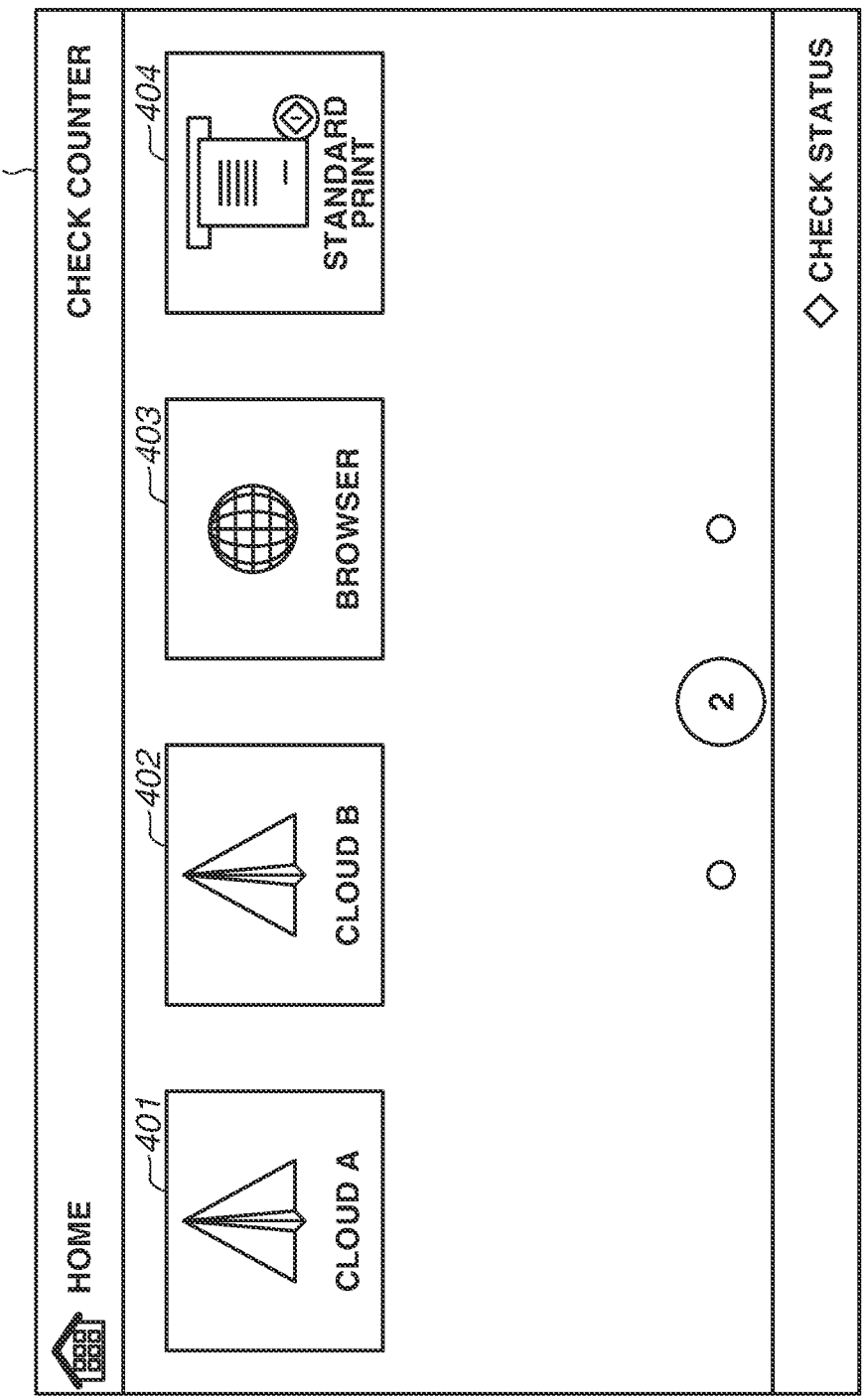

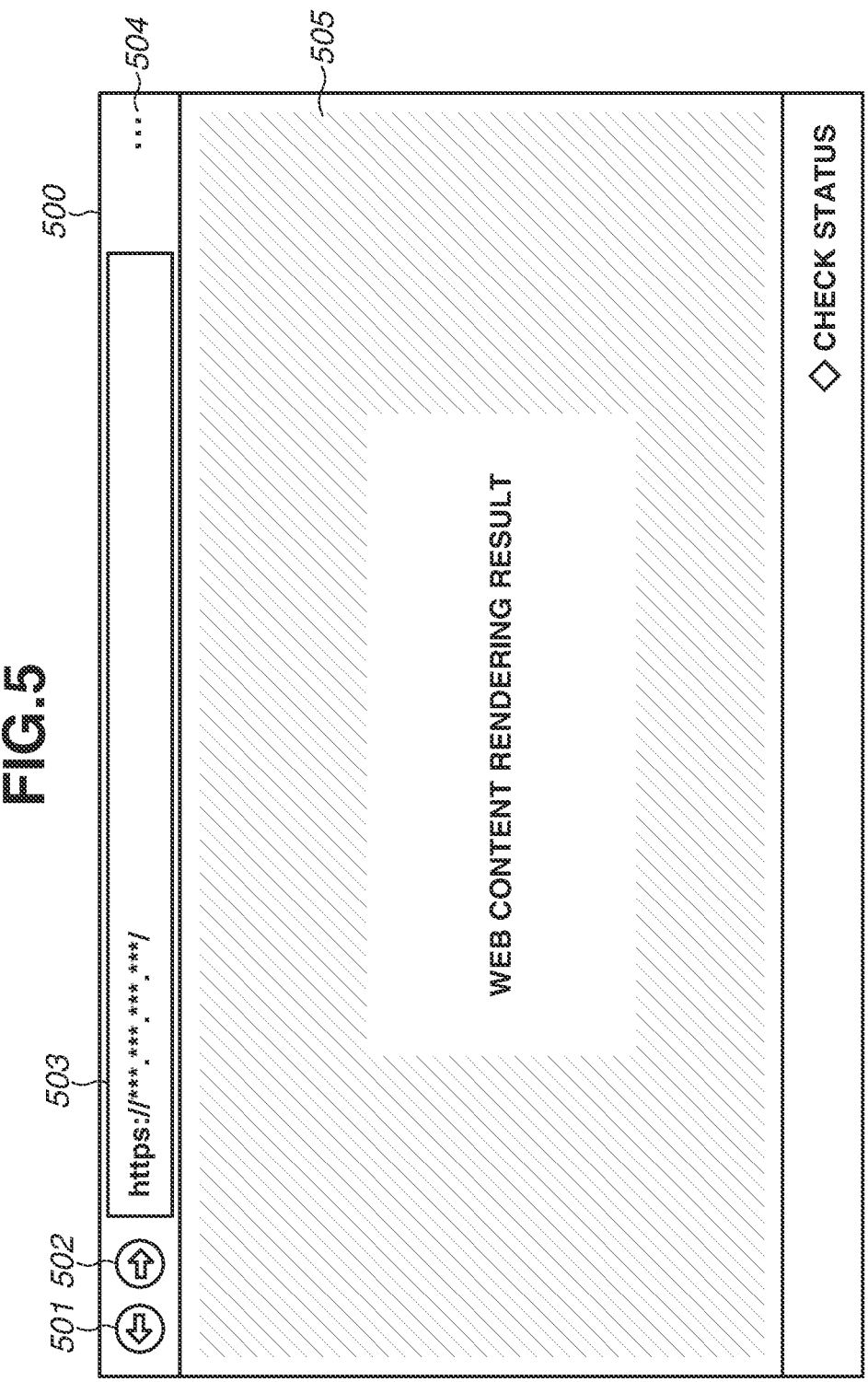

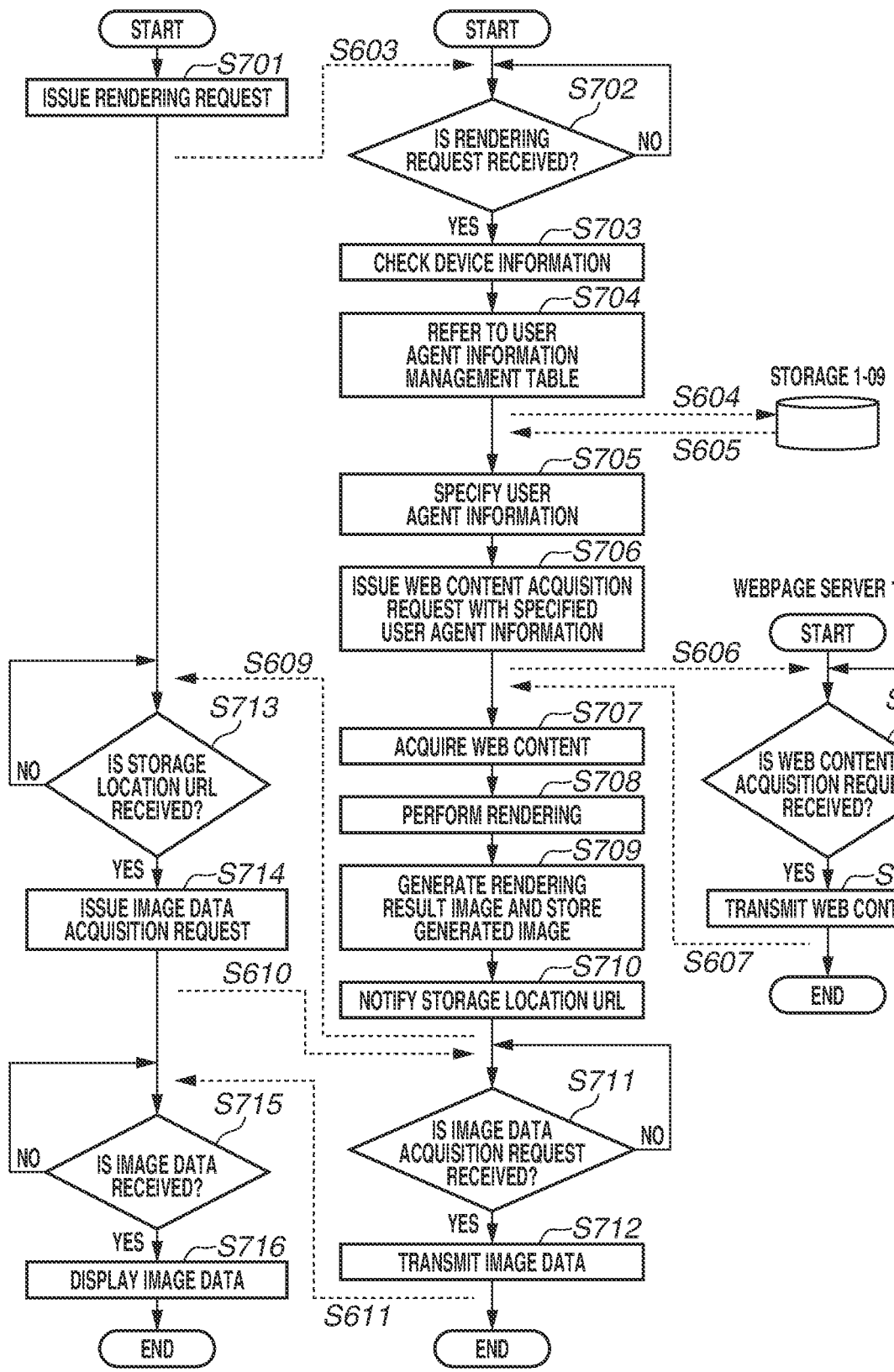

FIG.8A

| SCREEN SIZE | User Agent |
|---|---|
| 120 × 200 | User Agent A |
| 200 × 120 | User Agent B |
| 400 × 240 | User Agent C |
| ⋮ | ⋮ |

FIG.8B

| SCREEN TYPE | User Agent |
|---|---|
| Panel Type A | User Agent A |
| Panel Type B | User Agent B |
| Panel Type C | User Agent C |
| ⋮ | ⋮ |

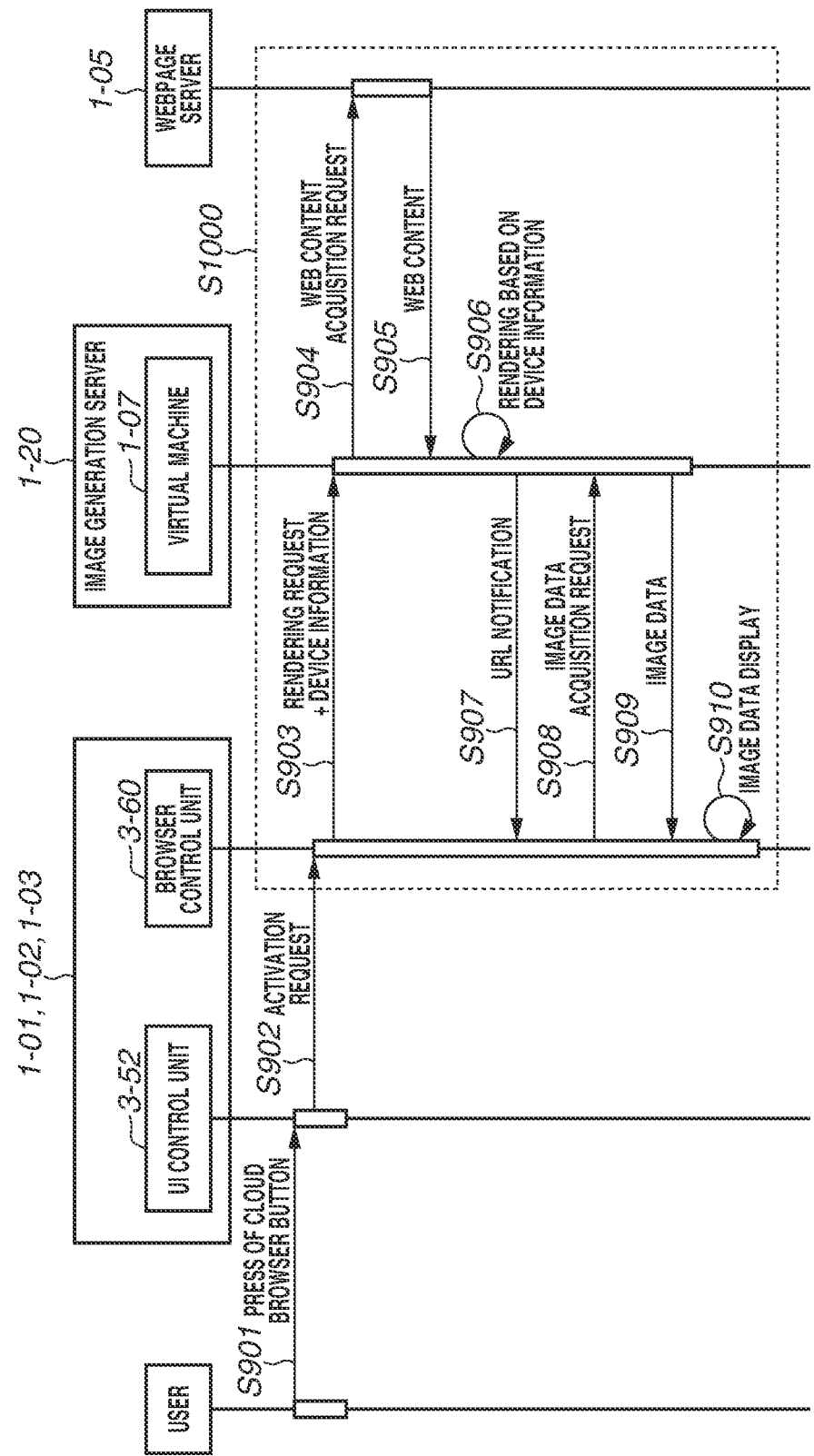

WEB BROWSING SYSTEM, SERVER, AND CONTROL METHOD FOR OFFLOADING A BROWSER ENGINE ONTO THE CLOUD

BACKGROUND OF THE DISCLOSURE

Field of the Disclosure

The present disclosure relates to a web browsing system that offloads a browser engine onto the cloud. Communication terminals that can use the foregoing web browsing system are image processing apparatuses such as printers, scanners, faxes, and multi-function peripherals thereof and general-purpose information processing apparatuses such as personal computers and mobile terminals.

Description of the Related Art

Communication terminals such as image processing apparatuses (information processing apparatuses) that include a web browser (hereinafter, referred to as the browser) and have a function of browsing webpages on the browser have been known. A communication terminal accessing a webpage of an external service via the web browser can extend a function by cooperating with the external service.

In recent years, a system known as a cloud browser that uses an image generation server configured to generate a webpage drawing result on a cloud server has been discussed. Japanese Patent Application Laid-Open No. 2022-41717 discusses a system in which a virtual machine on a network different from a network that a communication terminal belongs renders a webpage and the communication terminal displays a result of the rendering.

SUMMARY OF THE DISCLOSURE

According to an aspect of the present disclosure, a web browsing system includes a server configured to render a webpage, and a communication terminal configured to display the webpage based on a result of the rendering, the communication terminal including: a unit configured to transmit, to the server, address information of the webpage and specification information for specifying a display environment of the communication terminal, and a unit configured to receive, from the server, a render image of the webpage rendered based on a rendering condition specified based on the specification information, and the server including: a unit configured to receive the address information and the specification information from the communication terminal, and a unit configured to access the webpage based on the address information, generate the render image from the webpage based on the rendering condition specified based on the specification information, and transmit the render image to the communication terminal.

Further, features of the present disclosure will become apparent from the following description of exemplary embodiments with reference to the attached drawings.

BRIEF DESCRIPTION OF THE DRAWINGS

FIG. 4 is a diagram illustrating an example of a home screen display that is displayed on an operation unit of the image forming apparatus.

FIG. 5 is a diagram illustrating an example of a browser screen.

FIG. 7 is a flowchart illustrating control in the cloud browser system.

FIG. 8A is a diagram illustrating an example of a user agent information management table. FIG. 8B is a diagram illustrating an example of a user agent information management table.

FIG. 9 is a diagram illustrating an example of a sequence in the cloud browser system.

DESCRIPTION OF THE EMBODIMENTS

Various exemplary embodiments of the present disclosure will be described specifically below with reference to the drawings. It is to be noted that the scope of the present disclosure is not limited to configurations according to the exemplary embodiments. Modifications such as replacing part of a configuration or part of processing with an equivalent or omitting part of a configuration or part of processing can be made to an extent that a similar effect is produced.

<Cloud Browser System>

Figure 1:
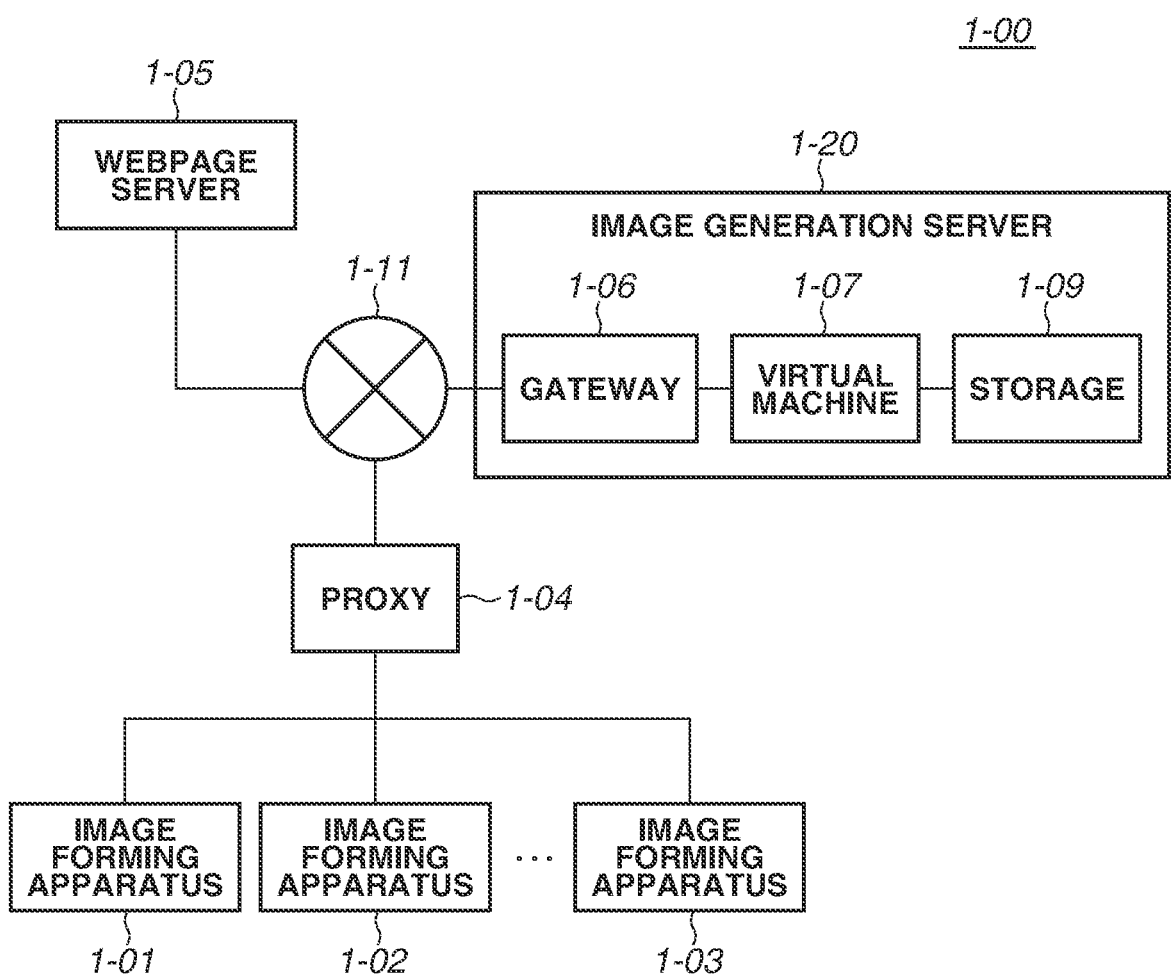
FIG. 1 is a diagram illustrating a configuration of an entire cloud browser system.

A first exemplary embodiment will be described below. FIG. 1 is a diagram illustrating a configuration of an entire cloud browser system. A cloud browser system 1-00 is a web browsing system that renders web content on the cloud. The cloud browser system 1-00 includes a plurality of image forming apparatuses 1-01 to 1-03 and an image generation server 1-20 to which the plurality of image forming apparatuses 1-01 to 1-03 is connected.

Further, the cloud browser system 1-00 either includes a proxy 1-04 and a webpage server 1-05 (web content provision server) configured to provide webpages or cooperates as an external service. While FIG. 1 illustrates an example where the three image forming apparatuses 1-01 to 1-03 are connected to the single image generation server 1-20, the number of image forming apparatuses to connect to the image generation server 1-20 is arbitrary. Further, the image generation server 1-20 is configured to provide a service to a plurality of image forming apparatuses in parallel or using time-division. Thus, the number of image generation servers 1-20 is relatively less than the number of image forming apparatuses in the cloud browser system 1-00. Further, the cloud browser system 1-00 can include a plurality of image generation servers in order to distribute loads. Hereinafter, a relationship between the image generation server 1-20 and the image forming apparatus 1-01, as an example of the plurality of image forming apparatuses, will be described below.

The image generation server 1-20 is a system on the cloud and provides a proxy web content rendering service. The image generation server 1-20 includes a gateway 1-06, a virtual machine 1-07, and a storage 1-09. A browser engine, which is a software module, operates on the virtual machine 1-07 of the image generation server 1-20. Details thereof will be described below. The browser engine receives, via the gateway 1-06, a uniform resource locator (URL) of a webpage server 1-05 that is transmitted from the image forming apparatus 1-01. Then, the browser engine accesses the webpage server 1-05 corresponding to the received URL via the gateway 1-06 and receives web content such as hypertext markup language (HTML) web content from the webpage server 1-05.

Thereafter, another separately-prepared software module configured to perform rendering generates a result of rendering the received web content. The result of rendering is transmitted to the image forming apparatus 1-01 via the gateway 1-06.

Further, for simplification of description, only one virtual machine 1-07 is present on the image generation server 1-20 according to the first exemplary embodiment. Alternatively, a plurality of virtual machines can be provided in order to improve, for example, availability and durability. In this case, a load balancer is provided between the gateway 1-06 and the plurality of virtual machines. Then, one of the plurality of virtual machines is selected based on a load status and operates the browser engine while the storage 1-09 is shared by the plurality of virtual machines.

The storage 1-09 of the image generation server 1-20 stores non-volatile information such as a setting that is needed for the browser engine to operate. Further, the storage 1-09 stores table data that manages device information transmitted from the image forming apparatus 1-01 in association with user agent information. Details thereof will be described below.

The image forming apparatus 1-01 is an image processing apparatus (information processing apparatus, communication terminal) having a function of forming (printing) images on sheets or a function of performing scanning, generating image data, and transmitting the generated image data to a destination. The image forming apparatus 1-01 can be either one of a multi-function peripheral (MFP) and a single-function peripheral (SFP). Further, a printing method of the image forming apparatus 1-01 can be either one of an electrophotographic method and an inkjet method. A feature of the image forming apparatus 1-01 according to the present exemplary embodiment is that the image generation server 1-20 is used to browse and display web content on the Internet. Details thereof will be described below.

The proxy 1-04 is a server that monitors and limits communication between the Internet and the network that the image forming apparatus 1-01 belongs. The proxy 1-04 performs URL filtering (web filtering) to limit access to websites.

<System Use Sequence>

Figure 12A:
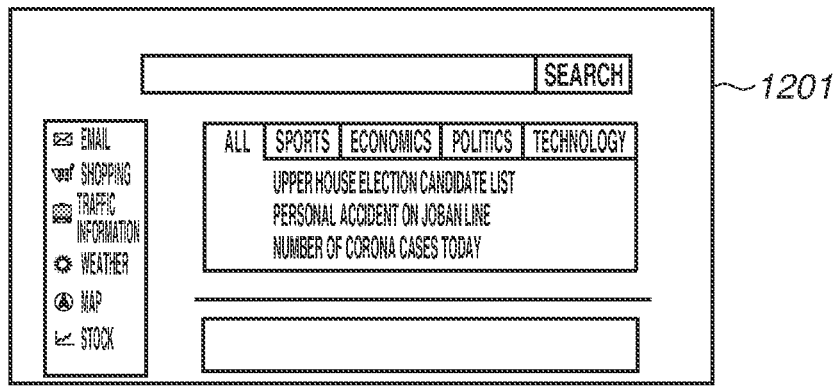
FIG. 12A is a diagram illustrating an example of a content display for a small-size display.
Figure 12B:
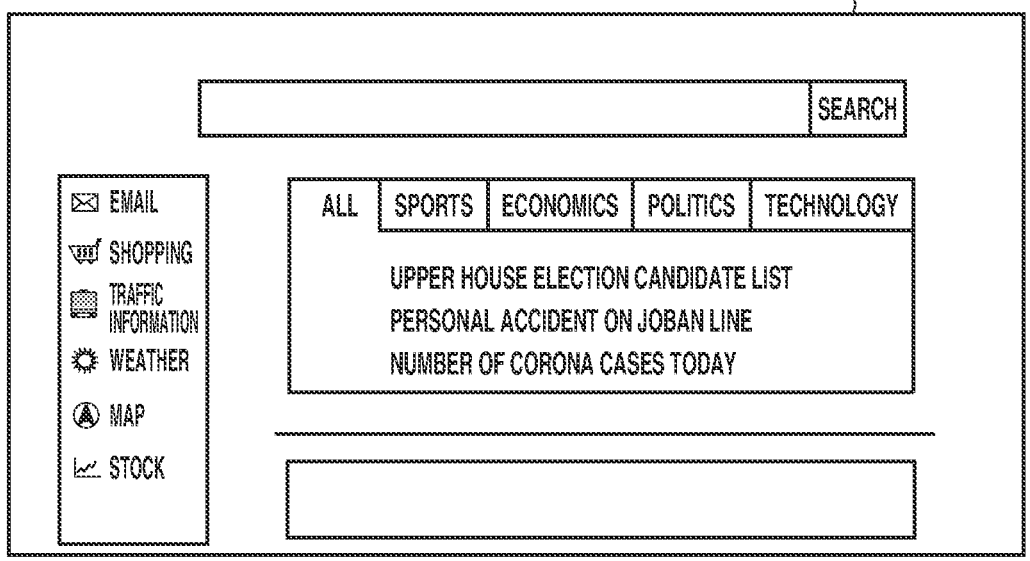
FIG. 12B is a diagram illustrating an example of a content display for a large-size display.
Figure 12C:
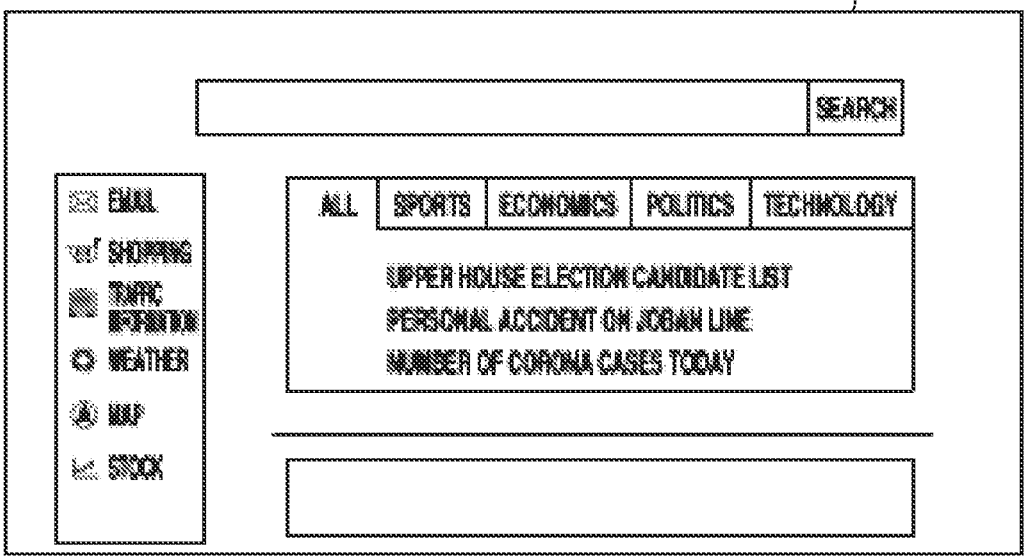
FIG. 12C is a diagram illustrating an example of a display that needs an improvement.

In the cloud browser system 1-00 according to the present exemplary embodiment, the image generation server 1-20 renders a webpage to output an image suitable for a display environment of the image forming apparatus 1-01, 1-02, or 1-03 that is to display the rendering result. FIG. 12A is a diagram illustrating an example of a content display for a small-size display. FIG. 12B is a diagram illustrating an example of a content display for a large-size display. FIG. 12C is a diagram illustrating an example of a display that needs an improvement. In a case where the cloud browser system 1-00 configured to provide a render image to a small-size display such as a screen 1201 in FIG. 12A that displays a web content provides the same rendering result to an apparatus having a large-size display, a screen such as a screen 1203 in FIG. 12C that is difficult to view is displayed. Thus, according to the present exemplary embodiment, display environment information (rendering condition) is taken into consideration in performing rendering so that an image with an appropriate size and an appropriate resolution, such as a screen 1202 in FIG. 12B, will be provided to an apparatus having a large-size display. With the foregoing configuration, a web browsing environment with excellent operability is provided even in a case where display environments of apparatuses for use in browsing a webpage are different.

A flow of use of the cloud browser system 1-00 will be described below with reference to FIG. 9. FIG. 9 is a diagram illustrating an example of a sequence in the cloud browser system 1-00.

In step S901, a user issues an instruction to perform a cloud browser function, and a user interface (UI) control unit 3-52 of the image forming apparatus 1-01 receives the instruction.

In step S902, the UI control unit 3-52 issues an activation request, and a browser control unit 3-60 is activated.

In step S903, the browser control unit 3-60 issues a webpage rendering request to the virtual machine 1-07. The rendering request contains URL information (address information) indicating a location of web content to be displayed and device information about the image forming apparatus 1-01. The device information is, for example, screen size information of an operation unit 3-12 of the image forming apparatus 1-01 and specification information for specifying the operation unit 3-12. An example of specification information is screen type information. The URL information indicating the location of the web content is information about a preset URL or information about a URL input by the user.

In step S904, the virtual machine 1-07 issues a web content acquisition request to the webpage server 1-05.

In step S905, the webpage server 1-05 transmits the web content in response to the web content acquisition request.

In step S906, the virtual machine 1-07 renders the web content after performing adjustment processing to output an image suitable for display on the image forming apparatus 1-01 based on the device information contained in the rendering request received in step S903. The adjustment processing adjusts a display size, a text size, a resolution, and an image size in the content.

In step S907, the virtual machine 1-07 notifies the browser control unit 3-60 of URL information indicating a location of rendering result image data.

In step S908, the browser control unit 3-60 issues a rendering result image data acquisition request using the URL information received in step S907.

In step S909, the webpage server 1-05 transmits the image data in response to the image data acquisition request.

In step S910, the browser control unit 3-60 displays the image data received in step S909.

<Virtual Machine>

Figure 2A:
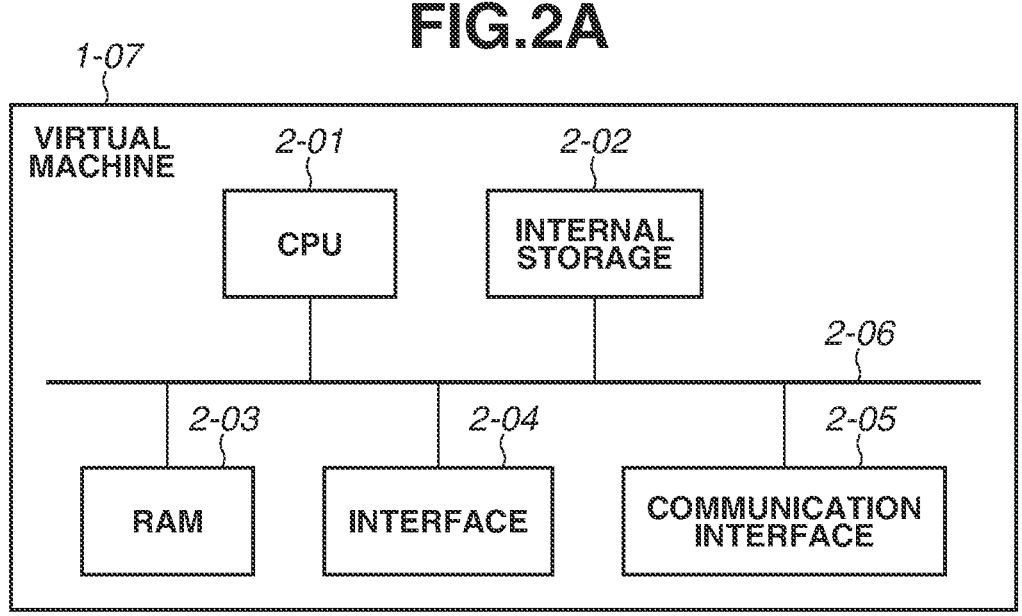
FIG. 2A is a block diagram illustrating an example of a hardware configuration of a virtual machine that operates in the cloud browser system.

FIG. 2A is a block diagram illustrating an example of a hardware configuration of the virtual machine 1-07 that operates in the cloud browser system 1-00.

The virtual machine 1-07 includes a central processing unit (CPU) 2-01, an internal storage 2-02, a random access memory (RAM) 2-03, an interface 2-04, and a communication interface 2-05. The foregoing components are connected via a bus 2-06 to communicate with each other.

The CPU 2-01 is a control unit that performs various types of control of the virtual machine 1-07. The CPU 2-01 performs various types of processing using computer programs and data that are stored in the internal storage 2-02. By doing so, the CPU 2-01 controls operations of the entire virtual machine 1-07 and performs or controls below-described processing run on the virtual machine 1-07.

The internal storage 2-02 stores setting data on the virtual machine 1-07, computer programs and data that relate to activation of the virtual machine 1-07, and computer programs and data that relate to basic operations of the virtual machine 1-07.

The RAM 2-03 includes an area for storing computer programs and data that are loaded from the internal storage 2-02 and data received from external apparatuses via the communication interface 2-05. Further, the RAM 2-03 includes a work area for use by the CPU 2-01 in performing various types of processing. As described above, the RAM 2-03 can provide various areas (storage areas) as needed.

The interface 2-04 is an interface that includes a display unit and an operation unit. The display unit displays results of processing performed by the CPU 2-01 using images and text. The user operates the operation unit to input various operations. The display unit (display device) includes a liquid crystal screen and a touch panel screen. The operation unit includes UIs such as a keyboard, a mouse, and a touch panel screen.

The communication interface 2-05 is an interface for performing data communication with external apparatuses. For example, a network interface that supports Ethernet is used as the communication interface 2-05.

It is to be noted that the configuration illustrated in FIG. 2A is merely an example of a configuration applicable to the virtual machine 1-07 and is not intended to be a limitation. For example, another memory apparatus can be connected to the bus 2-06 of the configuration illustrated in FIG. 2A. Examples of the memory apparatus include a hard disk drive, a universal serial bus (USB) memory, a magnetic card, an optical card, an integrated circuit (IC) card, a memory card, and a drive apparatus.

Further, the virtual machine 1-07 can be configured using virtual technology, and various resources that form a computer system can be arranged in logical units independently of the physical configuration. Specifically, a plurality of resources can be combined together to form the virtual machine 1-07, or a single resource can be divided to use one of the divided portions as the virtual machine 1-07. The virtual machine 1-07 can be formed using at least part of a plurality of resources (that can be formed by a plurality of apparatuses) of an information processing system that forms a cloud.

Figure 2B:
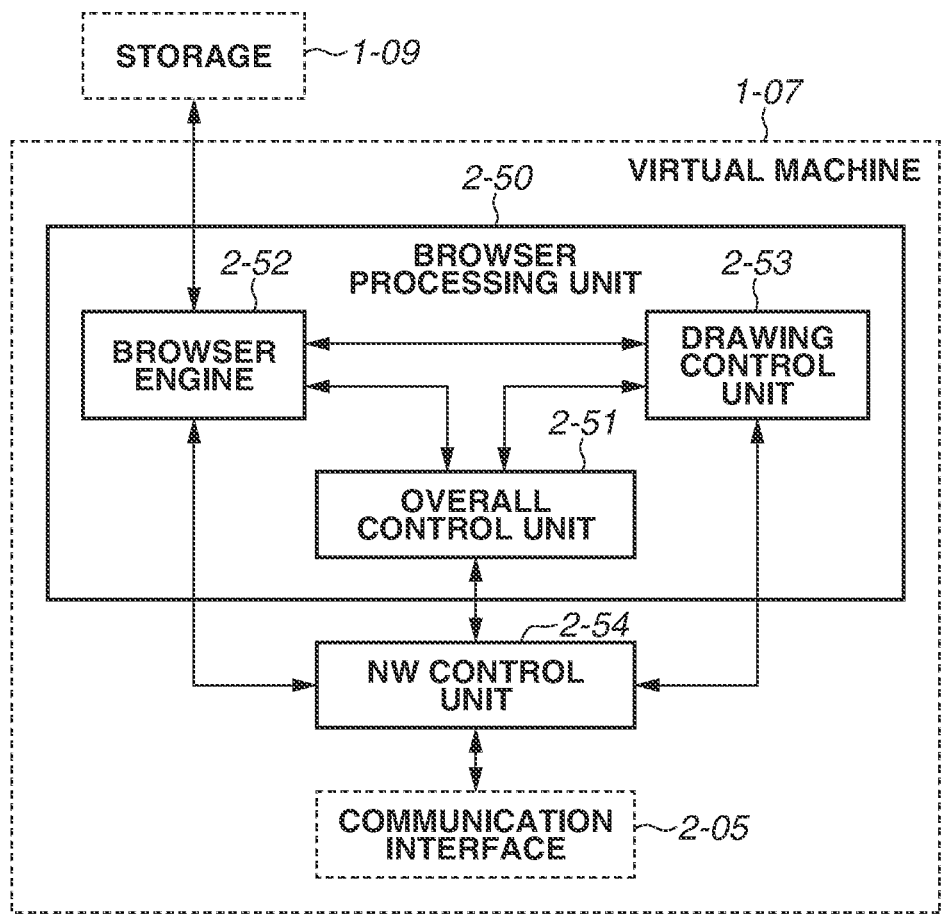
FIG. 2B is a diagram illustrating a software configuration of the virtual machine that operates in the cloud browser system.

FIG. 2B is a diagram illustrating a software configuration of the virtual machine 1-07 operating on the cloud browser system 1-00. As illustrated in FIG. 2B, the virtual machine 1-07 includes a browser processing unit 2-50 and a network (NW) control unit 2-54 as software modules.

The browser processing unit 2-50 is a module responsible for overall browser-related processing performed on the cloud and is a main part of the cloud browser system 1-00. The browser processing unit 2-50 includes an overall control unit 2-51, a browser engine 2-52, and a drawing control unit 2-53.

The overall control unit 2-51 is a module that controls the entire browser processing unit 2-50 operating on the virtual machine 1-07. In a case where the user operates the image forming apparatus 1-01 and inputs a request to browse a webpage that the user wishes to browse, a URL of the webpage is transmitted from the image forming apparatus 1-01 to the image generation server 1-20 via the proxy 1-04. The overall control unit 2-51 has a role of receiving various requests transmitted from the image forming apparatus 1-01. Further, the overall control unit 2-51 also has a role of suitably distributing the received requests to the browser engine 2-52 and the drawing control unit 2-53 described below.

The browser engine 2-52 accesses the webpage provided by the webpage server 1-05 illustrated in FIG. 1 via the NW control unit 2-54 described below based on the URL transmitted from the overall control unit 2-51 and acquires web content of the webpage. It is to be noted that the browser engine 2-52 includes a Hypertext Transfer Protocol (HTTP) client function needed to acquire the web content. Then, the browser engine 2-52 analyzes the acquired web content, and when the web content analysis is completed, the browser engine 2-52 issues a rendering processing request to the drawing control unit 2-53 described below.

The drawing control unit 2-53 has a role of rendering the web content based on the rendering request from the browser engine 2-52. Further, the drawing control unit 2-53 also has a role of returning a rendering result to the image forming apparatus 1-01 having issued the URL request via the NW control unit 2-54 described below. At this time, the storage 1-09 can be used as an area for storing the rendering result, and the drawing control unit 2-53 can transfer the image data stored in the storage 1-09.

The NW control unit 2-54 is a module that receives requests to access an external source from the overall control unit 2-51, the browser engine 2-52, and the drawing control unit 2-53 and mediates communication. A target external source of the access requests can be the image forming apparatus 1-01 or the webpage server 1-05. Further, the NW control unit 2-54 also includes the HTTP communication protocol stack needed in accessing the webpage server 1-05. In performing actual communication, the NW control unit 2-54 controls the communication interface 2-05 illustrated in FIG. 2A and realizes communication with the image forming apparatus 1-01 and the webpage server 1-05.

<Image Forming Apparatus>

Figure 3A:
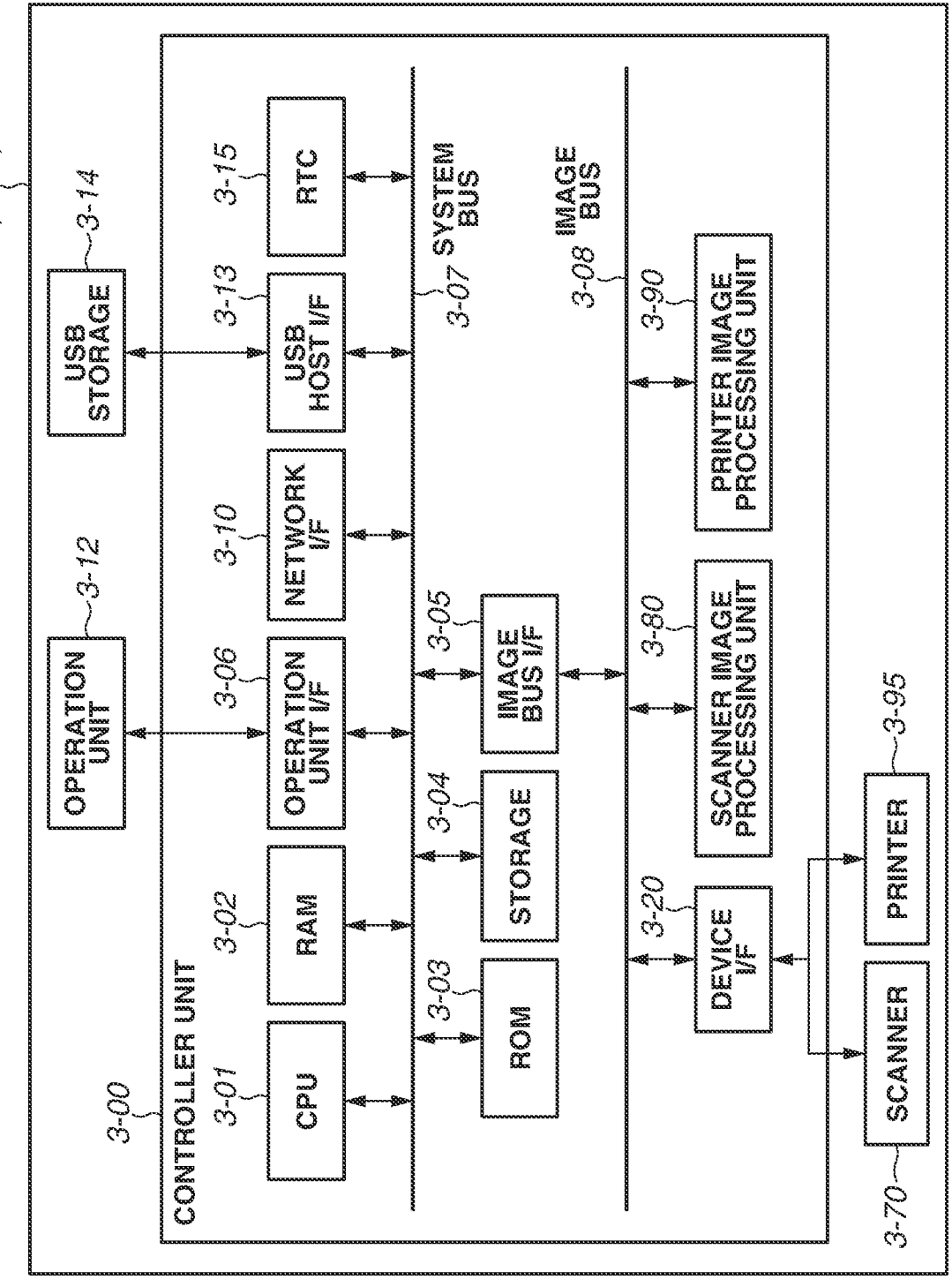
FIG. 3A is a diagram illustrating a hardware configuration of an image forming apparatus that operates in the cloud browser system.

FIG. 3A is a diagram illustrating a hardware configuration of the image forming apparatuses 1-01, 1-02, and 1-03 that operate in the cloud browser system 1-00. The image forming apparatus 1-01 includes a controller unit 3-00, the operation unit 3-12, a USB storage 3-14, a scanner 3-70, and a printer 3-95. The scanner 3-70, the printer 3-95, and the operation unit 3-12 are connected to the controller unit 3-00. The scanner 3-70 is an image input device, and the printer 3-95 is an image output device.

The operation unit 3-12 is an operation unit that displays information to the user and receives input from the user.

The operation unit 3-12 includes, for example, a display, a touch panel sensor, and hardware keys. According to the present exemplary embodiment, the displays of the operation units 3-12 of the image forming apparatuses 1-01, 1-02, and 1-03 are different in shape and size.

The USB storage 3-14 is an external storage apparatus that stores data. The USB storage 3-14 is attachable to and detachable from a USB host interface (UF) 3-13.

The scanner 3-70 is an image scanning unit (image scanning device or image input device) that scans images from documents.

The printer 3-95 is an image forming unit (image forming device or image output device) that forms images on sheets.

The controller unit 3-00 is a control unit having a configuration for performing various types of control in the image forming apparatus 1-01. For example, the controller unit 3-00 performs control to realize a copy function of printing image data scanned by the scanner 3-70 using the printer 3-95 and outputting the printed material.

The controller unit 3-00 includes a CPU 3-01, a RAM 3-02, a ROM 3-03, a storage 3-04, and an image bus I/F 3-05. The foregoing components are connected via a system bus 3-07 to communicate with each other.

Further, the controller unit 3-00 includes an operation unit I/F 3-06, a network I/F 3-10, the USB host I/F 3-13, a real time clock (RTC) 3-15, a device I/F 3-20, a scanner image processing unit 3-80, and a printer image processing unit 3-90. The foregoing components and the image bus I/F 3-05 are connected via an image bus 3-08 to communicate with each other.

The CPU 3-01 activates an operating system (OS) using a boot program stored in the ROM 3-03. The CPU 3-01 executes, on the OS, programs stored in the storage 3-04 to perform various types of processing.

The RAM 3-02 is used as a work area of the CPU 3-01. The RAM 3-02 provides the work area and also provides an image memory area for temporarily storing image data.

The storage 3-04 stores programs and image data. A hard disk drive (HDD), a solid state drive (SSD), or an embedded multimedia card (eMMC) can be used as the storage 3-04.

The ROM 3-03, the RAM 3-02, the operation unit I/F 3-06, and the network I/F 3-10 are connected to the CPU 3-01 via the system bus 3-07. Further, the USB host I/F 3-13 and the image bus I/F 3-05 are also connected.

The operation unit I/F 3-06 is an interface for the operation unit 3-12 and outputs image data to be displayed on the operation unit 3-12 to the operation unit 3-12. Further, the operation unit I/F 3-06 transmits information input by the user via the operation unit 3-12 to the CPU 3-01.

The network I/F 3-10 is an interface for connecting the image forming apparatus 1-01 to a local area network (LAN).

The USB host I/F 3-13 is an interface unit that communicates with the USB storage 3-14. The USB host I/F 3-13 also functions as an output unit for storing, in the USB storage 3-14, data stored in the storage 3-04. Further, the USB host I/F 3-13 inputs data stored in the USB storage 3-14 and notifies the data input to the CPU 3-01.

The USB storage 3-14 is an external storage apparatus that stores data and is attachable to and detachable from the USB host I/F 3-13. A plurality of USB devices including the USB storage 3-14 can be connected to the USB host I/F 3-13.

The RTC 3-15 controls the current time. Time information controlled by the RTC 3-15 is used in recording job input times.

The image bus I/F 3-05 is a bus bridge that connects the system bus 3-07 and the image bus 3-08 and converts data formats. The image bus 3-08 transfers image data at high speed.

The image bus 3-08 includes a peripheral component interconnect (PCI) bus. The device I/F 3-20, the scanner image processing unit 3-80, and the printer image processing unit 3-90 are provided on the image bus 3-08.

The scanner 3-70 and the printer 3-95 are connected to the device I/F 3-20, and the device I/F 3-20 performs synchronous/asynchronous image data conversion.

The scanner image processing unit 3-80 corrects, processes, and/or edits input image data.

The printer image processing unit 3-90 performs correction and/or resolution conversion on print output image data as suitable for the printer 3-95.

Figure 3B:
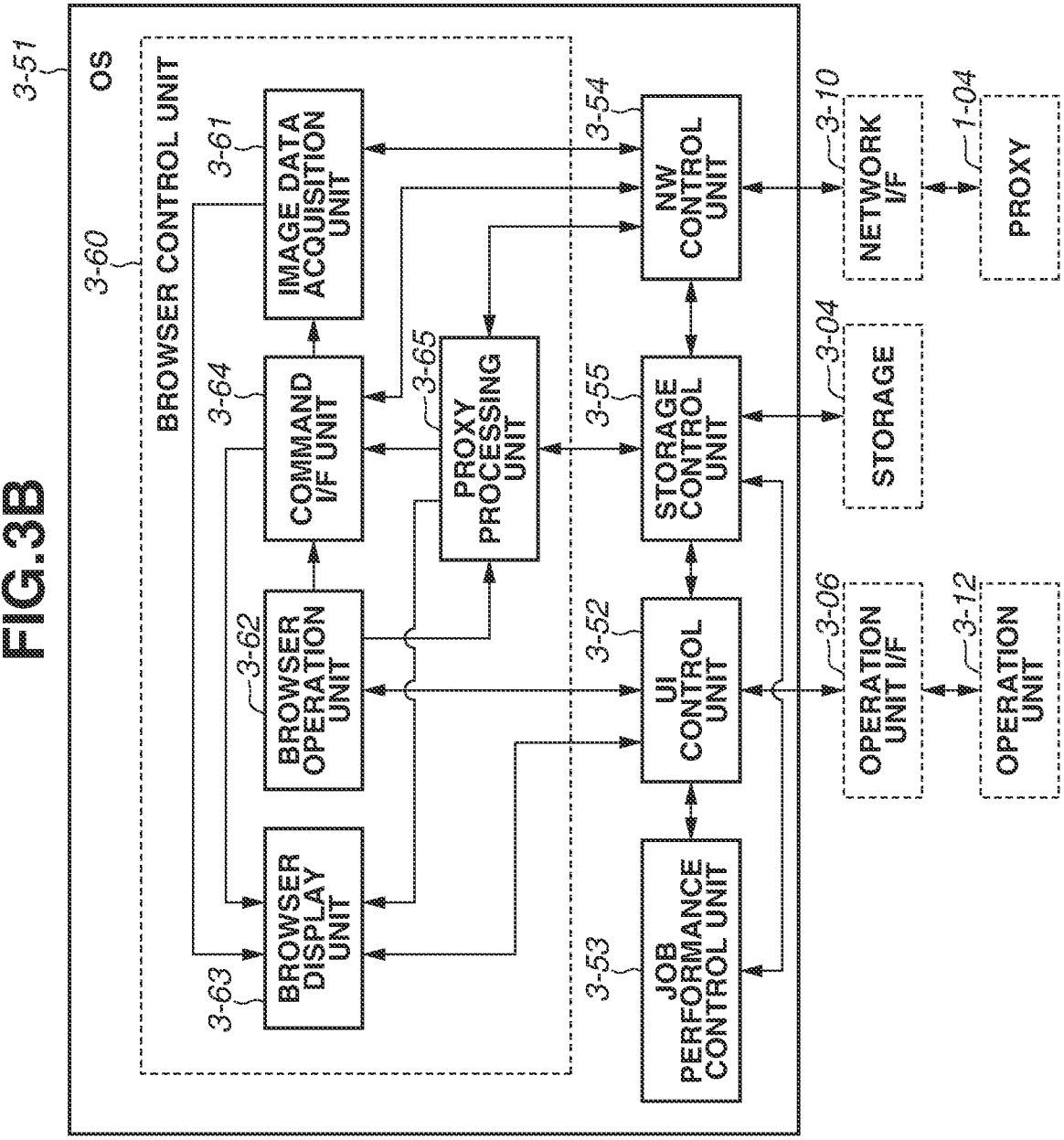
FIG. 3B is a diagram illustrating a software configuration of the image forming apparatus that operates in the cloud browser system.

FIG. 3B is a diagram illustrating a software configuration of the image forming apparatuses 1-01, 1-02, and 1-03 that operate in the cloud browser system 1-00.

Each portion specified with a solid line in FIG. 3B is a software module that is realized by the CPU 3-01 by executing a main program loaded onto the RAM 3-02.

Execution of each module described below by the main program is managed and controlled by an OS 3-51.

The UI control unit 3-52 displays a screen on the operation unit 3-12 and receives operations from the user via the operation unit OF 3-06. Further, the UI control unit 3-52 has a function of issuing notifications to other modules, receiving drawing instructions from other modules, and controlling screen updates.

A job performance control unit 3-53 is a module that receives job performance instructions from the UI control unit 3-52 and controls processing of jobs such as copy, scan, and print jobs.

A NW control unit 3-54 receives communication requests from other modules, controls the network OF 3-10, and controls communication with external apparatuses. Further, the NW control unit 3-54 receives notifications from external apparatuses and notifies content of the notifications to other modules.

A storage control unit 3-55 holds and manages setting information, job information, and user data that are recorded in the storage 3-04. Each module in a hierarchical layer of the OS 3-51 accesses the storage control unit 3-55, refers to setting values, and configures the setting values.

The browser control unit 3-60 is a sub-module included in the OS 3-51 and performs control specific to a cloud browser described below. Further, the number of sub-modules included in the OS 3-51 is arbitrary. The browser control unit 3-60 according to the present exemplary embodiment includes at least an image data acquisition unit 3-61, a browser operation unit 3-62, a browser display unit 3-63, a command interface OF unit 3-64, and a proxy processing unit 3-65, as illustrated in FIG. 3B.

The browser operation unit 3-62 has a function of receiving notifications of user operations from the UI control unit 3-52 and notifying details of the user operations to the command OF unit 3-64.

The command OF unit 3-64 has a role of controlling the entire browser control unit 3-60. Further, the command OF unit 3-64 receives notifications from the browser operation unit 3-62 and issues communication requests to communicate with the image generation server 1-20 via the NW control unit 3-54. The communication requests herein sometimes contain the notified information. The notified information can be user operations such as text input, link press, and scroll and zoom. For example, a URL is contained for the text input.

For the link press, coordinates of the press on the operation unit 3-12 are contained. For the scroll and zoom, associated character strings are contained. Furthermore, the command OF unit 3-64 receives communications from the image generation server 1-20 via the NW control unit 3-54. The command I/F unit 3-64 processes the received content, and issues notifications to the image data acquisition unit 3-61 or the browser display unit 3-63.

The image data acquisition unit 3-61 receives a rendering result completion notification from the command OF unit 3-64. On receipt of the notification, the image data acquisition unit 3-61 issues an image acquisition request to the image generation server 1-20. As illustrated in FIG. 2B, the image acquisition request is transmitted to the drawing control unit 2-53 operating on the virtual machine 1-07 forming the image generation server 1-20, and this module transmits an image and returns a rendering result to the image data acquisition unit 3-61. The image data acquisition unit 3-61 having received the rendering result transfers the image, which is the rendering result, to the browser display unit 3-63.

The browser display unit 3-63 receives the image from the image data acquisition unit 3-61 and issues an image drawing instruction to the UI control unit 3-52. Alternatively, the browser display unit 3-63 receives a notification from the command OF unit 3-64 and instructs the UI control unit 3-52 to display a message corresponding to the notification.

The proxy processing unit 3-65 receives a notification from the browser operation unit 3-62 and issues a proxy setting information acquisition request to the storage control unit 3-55. In a case where the proxy setting is enabled based on the acquired proxy setting information, the proxy processing unit 3-65 issues a communication request to the proxy 1-04 via the NW control unit 3-54. Furthermore, the proxy processing unit 3-65 has a function of receiving a response to the communication request from the NW control unit 3-54 and notifying a result of processing content of the response to the browser display unit 3-63 or the command OF unit 3-64.

<Operation Screen>

FIG. 4 is a diagram illustrating an example of a home screen display displayed on the operation unit 3-12 of the image forming apparatus 1-01. A home screen 400 displays a plurality of buttons for use by the user to input instructions to perform functions relating to the image forming apparatus 1-01. A button 401 is a button corresponding to a "cloud A" function. A button 402 is a button corresponding to a "cloud B" function. A button 403 is a button corresponding to the cloud browser system 1-00. A button 404 is a button corresponding to a "standard print" function.

In a case where the "browser" button 403 is pressed by the user, the browser control unit 3-60 illustrated in FIG. 3B is activated.

FIG. 5 is a diagram illustrating an example of a browser screen.

In a case where the "browser" button 403 is pressed and the browser control unit 3-60 is activated as described above with reference to FIG. 4, a browser screen 500 illustrated in FIG. 5 is displayed on the operation unit 3-12 of the image forming apparatus 1-01.

The browser screen 500 includes a previous button 501, a next button 502, an address bar 503, and a settings button 504. Below the foregoing items is a content area 505 where a web content rendering result is displayed. Roles thereof are similar to those of an existing browser.

The content area 505 is configured to display nothing after the browser control unit 3-60 is activated until a URL is input. A configuration of an existing browser that enables registration of a default URL via an item in the address bar 503 so that a result of rendering web content of the URL is displayed simultaneously with the activation can be used. In the example illustrated in FIG. 5, a result of rendering web content acquired from a webpage specified by the URL "https://*.*.*.*/" is displayed.

<Control>

Figure 10:
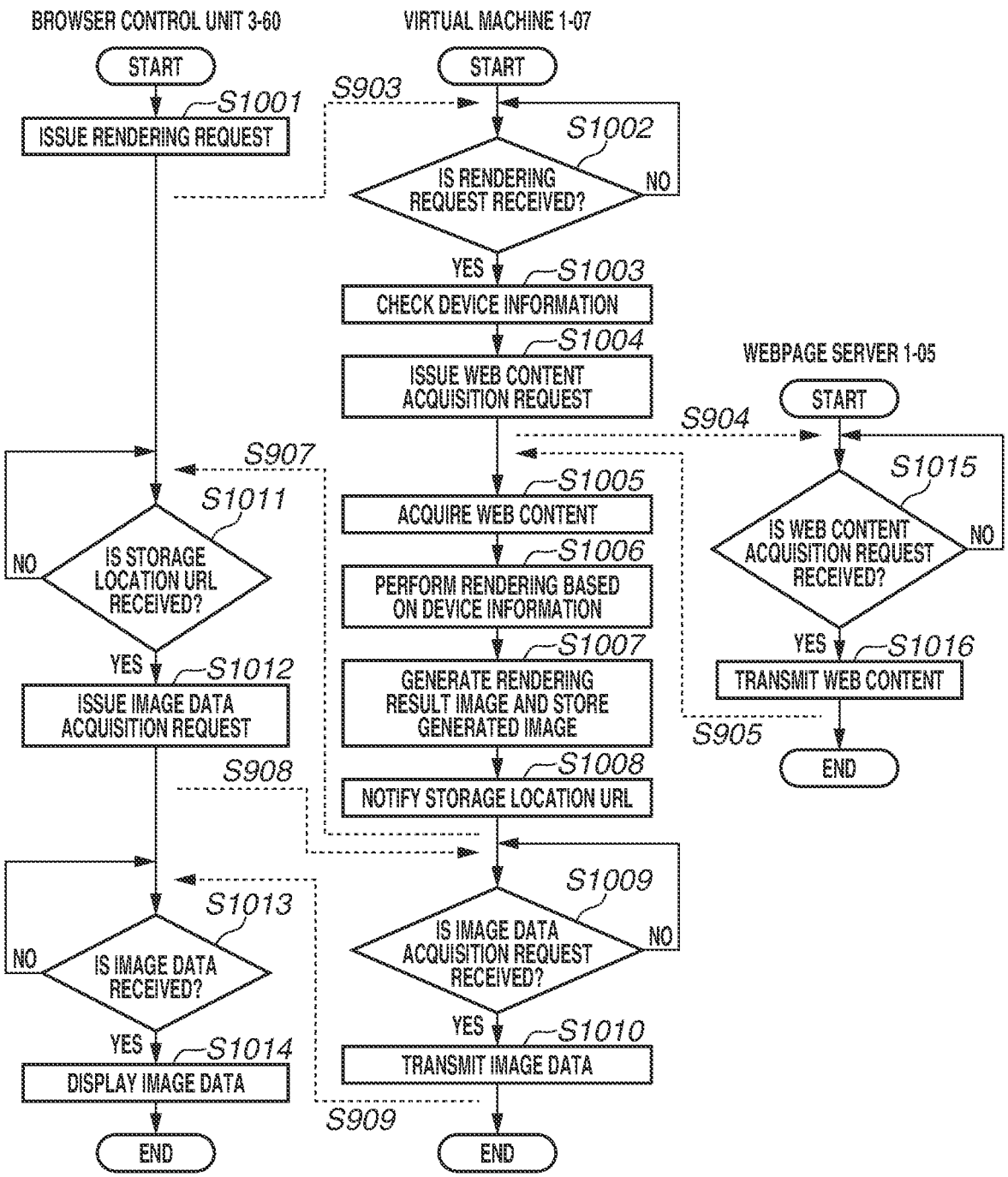
FIG. 10 is a flowchart illustrating control in the cloud browser system.

FIG. 10 is a flowchart illustrating control of the cloud browser system 1-00. FIG. 10 illustrates details of the processing in the section "step S1000" in FIG. 9. Each term "step S9XX" in FIG. 10 indicates information regarding its corresponding part in FIG. 9. Processing that the browser control unit 3-60 performs in FIG. 10 is implemented by the CPU 3-01 executing programs loaded to the RAM 3-02. Processing that the virtual machine 1-07 performs in FIG. 10 is implemented by the CPU 2-01 executing programs loaded to the RAM 2-03. Processing that the webpage server 1-05 performs in FIG. 10 is implemented by a CPU (not illustrated) executing programs loaded to a RAM (not illustrated).

In step S1001, the browser control unit 3-60 performs processing to issue a rendering request to the virtual machine 1-07. The rendering request herein contains URL information indicating a location of web content to be displayed and device information about the image forming apparatus 1-01 as described above. Examples of device information are screen size information of the operation unit 3-12 of the image forming apparatus 1-01, such as information 803 in FIG. 8, and screen type information for specifying the operation unit 3-12 of the image forming apparatus 1-01, such as information 805 in FIG. 8.

In step S1002, the virtual machine 1-07 determines whether a rendering request is received. In a case where the virtual machine 1-07 determines that no rendering request is received (NO in step S1002), the processing returns to step S1002, and the virtual machine 1-07 repeats the processing.

In a case where the virtual machine 1-07 determines that a rendering request is received (YES in step S1002), the processing proceeds to step S1003.

In step S1003, the virtual machine 1-07 checks the device information based on the information contained in the rendering request.

In step S1004, the virtual machine 1-07 issues a web content acquisition request to the URL information contained in the rendering request received in step S1002.

In step S1015, the webpage server 1-05 determines whether a web content acquisition request is received from the virtual machine 1-07. In a case where the webpage server 1-05 determines that no web content acquisition request is received (NO in step S1015), the processing returns to step S1015, and the webpage server 1-05 repeats the processing.

In a case where the webpage server 1-05 determines that a web content acquisition request is received (YES in step S1015), the processing proceeds to step S1016.

In step S1016, the webpage server 1-05 transmits, to the virtual machine 1-07, the web content corresponding to the web content acquisition request, and the process is ended.

In step S1005, the virtual machine 1-07 acquires the web content from the webpage server 1-05, and the processing proceeds to step S1006.

In step S1006, the virtual machine 1-07 performs rendering based on the device information checked in step S1003 to render the acquired web content into a display suitable for the operation unit 3-12. For example, in a case where 200×120 (pixels) screen size information (screen resolution information) is acquired as device information, the web content is rendered into an image with a display size, a text size, and a resolution that correspond to the 200×120 screen size information. Further, in a case where 400×240 screen size information is acquired as device information, the web content is rendered into an image with a display size, a text size, and a resolution that correspond to the 400×120 screen size information. The display size of the render image for the 400×240 screen size information is greater than the display size of the render image for the 200×120 screen size information. The text size of the render image for the 400×240 screen size information is greater than the text size of the render image for the 200×120 screen size information. The resolution of the render image for the 400×240 screen size information is higher than the resolution of the render image for the 200×120 screen size information.

In step S1007, the virtual machine 1-07 generates a rendering result image and stores the generated image. In step S1008, the virtual machine 1-07 notifies the browser control unit 3-60 of URL information indicating a storage location of the rendering result image.

In step S1011, the browser control unit 3-60 determines whether URL information indicating a storage location of a rendering result image is received from the virtual machine 1-07. In a case where the browser control unit 3-60 determines that no URL information indicating a storage location of a rendering result image is received (NO in step S1011), the processing returns to step S1011, and the browser control unit 3-60 repeats the processing. In a case where the browser control unit 3-60 determines that URL information indicating a storage location of a rendering result image is received (YES in step S1011), the processing proceeds to step S1012.

In step S1012, the browser control unit 3-60 issues an image data acquisition request to the virtual machine 1-07.

In step S1009, the virtual machine 1-07 determines whether an image data acquisition request is received from the browser control unit 3-60. In a case where the virtual machine 1-07 determines that no image data acquisition request is received (NO in step S1009), the processing returns to step S1009, and the virtual machine 1-07 repeats the processing. In a case where the virtual machine 1-07 determines that an image data acquisition request is received (YES in step S1009), in step S1010, the virtual machine 1-07 transmits the image data to the browser control unit 3-60, and the process is ended.

In step S1013, the browser control unit 3-60 determines whether image data is received from the virtual machine 1-07. In a case where the browser control unit 3-60 determines that no image data is received (NO in step S1013), the processing returns to step S1013, and the browser control unit 3-60 repeats the processing. In a case where the browser control unit 3-60 determines that image data is received (YES in step S1013), the processing proceeds to step S1014.

In step S1014, the browser control unit 3-60 displays the received image data on the display of the operation unit 3-12, and the process is ended.

In the above-described example according to the first exemplary embodiment, a screen display is improved by adjusting details of the rendering based on the device information about the image forming apparatus 1-01, which is a display apparatus. In an example according to a second exemplary embodiment described below, a screen display is improved by adjusting details of web content to acquire based on the device information about the image forming apparatus 1-01, which is a display apparatus. Components in a system according to the second exemplary embodiment are similar to those according to the first exemplary embodiment, except for feature points. Thus, corresponding components are given the same reference numeral, and detailed descriptions thereof are omitted.

<System Use Sequence>

In the cloud browser system 1-00 according to the present exemplary embodiment, the image generation server 1-20 acquires a webpage to acquire content suitable for a display environment of the image forming apparatus 1-01, 1-02, or 1-03 that is to display a rendering result.

Figure 11A:
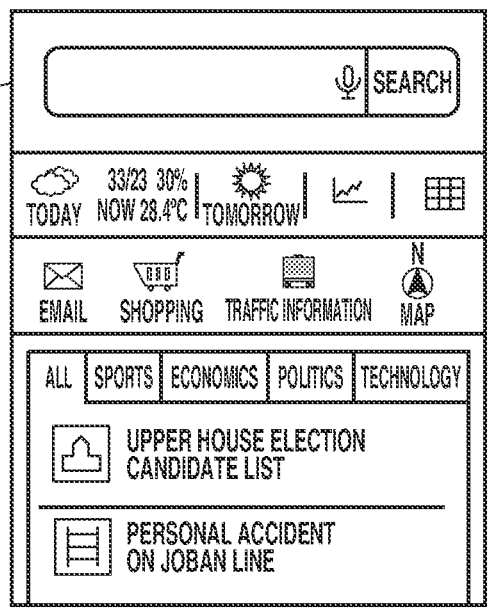
FIG. 11A is a diagram illustrating an example of a content display for a small-size display.
Figure 11B:
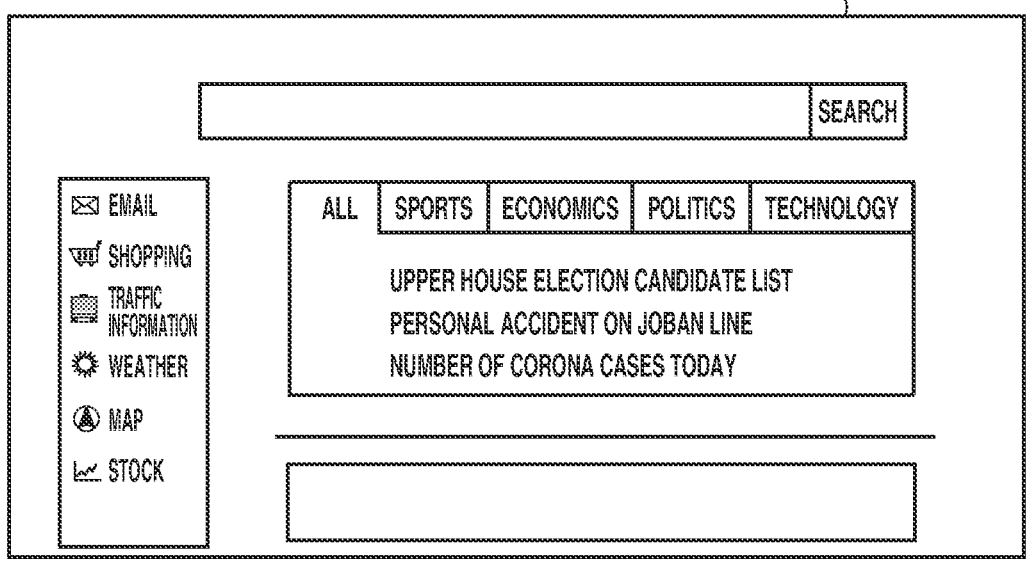
FIG. 11B is a diagram illustrating an example of a content display for a large-size display.
Figure 11C:
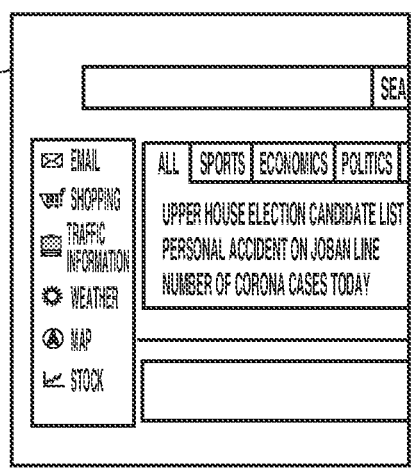
FIG. 11C is a diagram illustrating an example of a display that needs an improvement.

FIG. 11A is a diagram illustrating an example of a content display for a small-size display. FIG. 11B is a diagram illustrating an example of a content display for a large-size display. FIG. 11C is a diagram illustrating an example of a display that needs an improvement.

A case where the virtual machine 1-07 acquires content for a large-size display (content for a PC) and renders the acquired content into a render image such as a screen 1102 in FIG. 11B will be discussed below. In a case where the render image is provided to an apparatus with a large-size display, the provided image is displayed as the screen 1102. Thus, the render image is suitable. On the other hand, in a case where the render image is provided to an apparatus with a small-size display, the provided image is displayed as a screen 1103 in FIG. 11C. Therefore, the render image is unsuitable.

For an apparatus with a small-size display, a display such as a screen 1101 in FIG. 11A is desirable. Thus, the virtual machine 1-07 according to the present exemplary embodiment acquires web content using user agent information corresponding to a display size of an apparatus that is to display the web content. With the foregoing configuration, a web browsing environment with excellent operability is provided even in a case where display environments of apparatuses for use in browsing webpages are different.

Figure 6:
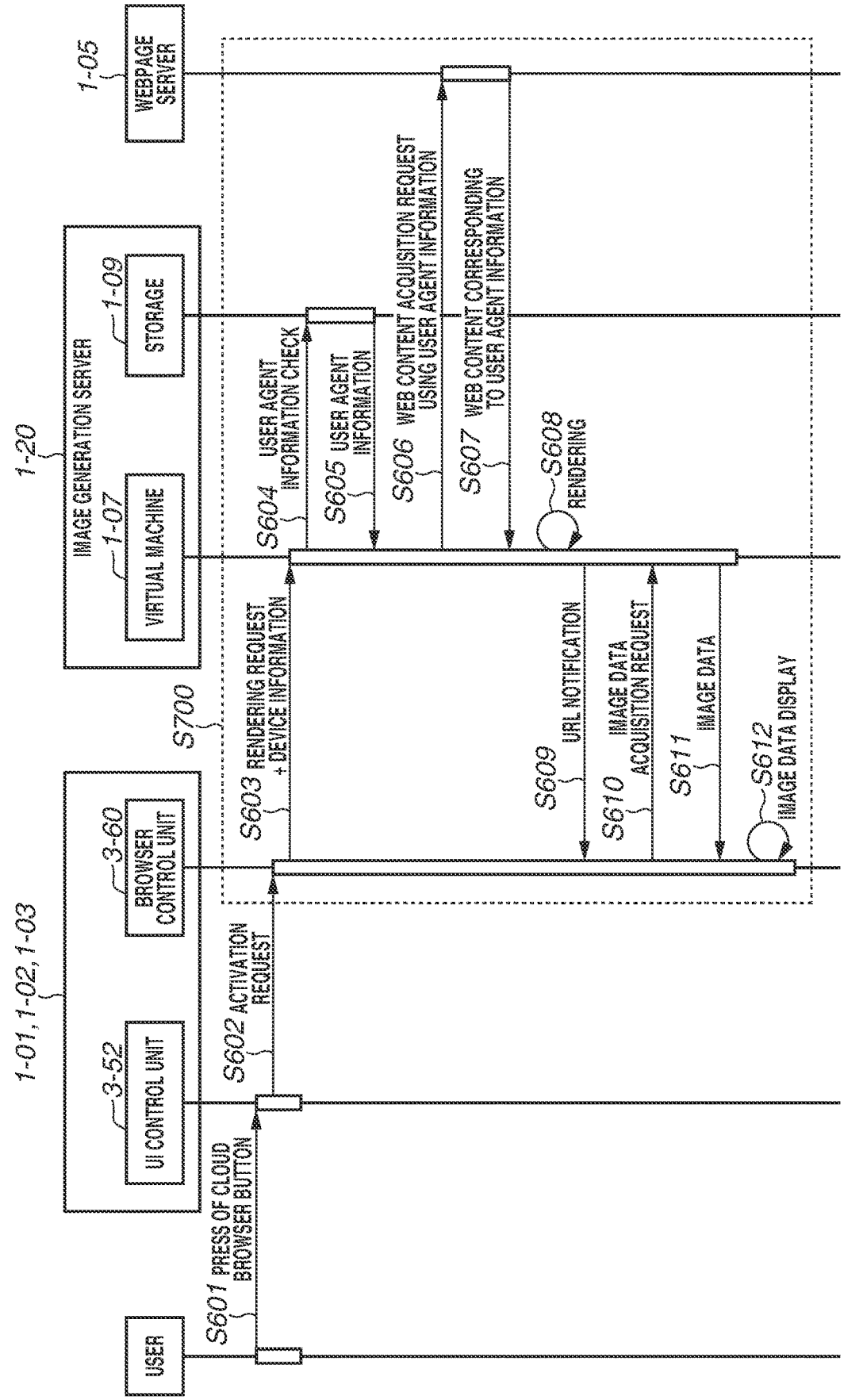
FIG. 6 is a diagram illustrating an example of a sequence using user agent information in the cloud browser system.

FIG. 6 is a diagram illustrating an example of a sequence in a case where the image generation server 1-20 receives a rendering request from the browser control unit 3-60, where the image generation server 1-20 selects user agent information from the received information, and issues a web content acquisition request. In FIG. 6, user agent information is selected based on the device information (specification information) about the image forming apparatus 1-01 that is acquired from the browser control unit 3-60, and a web content acquisition request is issued. Consequently, content that is suitable for the screen size of the operation unit 3-12 of the image forming apparatus 1-01 is acquired. The user agent information herein is information contained in a HTTP request transmitted to a server. The user agent information contains system information such as a request source OS and a browser type. The server determines a terminal based on the user agent information and changes content to be generated based on the terminal. For example, for a portrait-oriented terminal with a small screen size, such as a mobile terminal, the server provides content with a layout that is easy to perform touch operations, whereas for a terminal with a large screen size, the server provides content with a layout suitable for lists.

In step S601, the user issues an instruction to perform the cloud browser function, and the UI control unit 3-52 of the image forming apparatus 1-01 receives the instruction.

In step S602, the UI control unit 3-52 issues an activation request, and the browser control unit 3-60 is activated.

In step S603, the browser control unit 3-60 issues a webpage rendering request to the virtual machine 1-07. The rendering request contains URL information indicating a location of web content to be displayed and the device information about the image forming apparatus 1-01. The device information is, for example, screen size information of the operation unit 3-12 of the image forming apparatus 1-01 and screen type information for specifying the operation unit 3-12. Further, the URL information indicating the location of the web content is information about a preset URL or information about a URL input by the user.

In step S604, the browser control unit 3-60 refers to the storage 1-09 using the acquired device information.

In step S605, the browser control unit 3-60 acquires user agent information corresponding to the acquired device information.

In step S606, the virtual machine 1-07 issues a web content acquisition request to the webpage server 1-05. The acquisition request uses the URL information acquired in step S603 and the user agent information acquired in step S605.

In step S607, the webpage server 1-05 transmits the web content in response to the web content acquisition request. The webpage server 1-05 herein provides the content corresponding to the user agent information contained in the acquisition request.

In step S608, the virtual machine 1-07 renders the web content.

In step S609, the virtual machine 1-07 notifies the browser control unit 3-60 of URL information indicating a location of rendering result image data.

In step S610, the browser control unit 3-60 issues a rendering result image data acquisition request using the URL information received in step S607.

In step S611, the webpage server 1-05 transmits the image data in response to the image data acquisition request.

In step S612, the browser control unit 3-60 displays the image data received in step S609.

<Control>

FIG. 7 is a flowchart illustrating control of the cloud browser system 1-00. FIG. 7 illustrates details of the processing in the section "step S700" in FIG. 6. Each term "step S6XX" in FIG. 7 indicates information regarding its corresponding part in FIG. 6. Processing that the browser control unit 3-60 performs in FIG. 7 is implemented by the CPU 3-01 executing programs loaded to the RAM 3-02. Processing that the virtual machine 1-07 performs in FIG. 7 is implemented by the CPU 2-01 executing programs loaded to the RAM 2-03. Processing that the webpage server 1-05 performs in FIG. 7 is implemented by a CPU (not illustrated) executing programs loaded to a RAM (not illustrated).

In step S701, the browser control unit 3-60 performs processing to issue a rendering request to the virtual machine 1-07. The rendering request contains URL information indicating a location of web content to be displayed and the device information about the image forming apparatus 1-01. The device information includes screen size information (resolution information and aspect ratio information) of the display of the image forming apparatus 1-01 or information for specifying the screen size. The screen size (resolution and aspect ratio) can be specified using, for example, identification information of the operation unit 3-12 such as a model number of the operation unit 3-12 or identification information of the image forming apparatus 1-01 such as a model number of the image forming apparatus 1-01.

In step S702, the virtual machine 1-07 determines whether a rendering request is received. In a case where the virtual machine 1-07 determines that no rendering request is received (NO in step S702), the processing returns to step S702, and the virtual machine 1-07 repeats the processing. In a case where the virtual machine 1-07 determines that a rendering request is received (YES in step S702), the processing proceeds to step S703.

In step S703, the virtual machine 1-07 checks the device information from the information contained in the rendering request.

In step S704, the virtual machine 1-07 refers to a user agent information management table stored in the storage 1-09. FIG. 8 illustrates an example of the user agent information management table. An information management table 801 in FIG. 8 is an information table associating the screen size information 803 of the operation unit 3-12 of the image forming apparatus 1-01 with user agent information 804. According to the present exemplary embodiment, user agent information for acquiring web content suitable for the screen size of the operation unit 3-12 of the image forming apparatus 1-01 is predefined, and the predefined user agent information is stored. The corresponding user agent information is acquired using the device information contained in the rendering request. While an example of an information management table associating screen size information with user agent information is described herein, an information management table in another form can be used. For example, a table associating the screen type information 805 for specifying the operation unit 3-12 of the image forming apparatus 1-01 with the user agent information 804, such as an information management table 802 in FIG. 8B, can be used. Further, a table associating the identification information of the image forming apparatus 1-01 with the user agent information can be used.

In step S705, the virtual machine 1-07 specifies a user agent for acquiring web content suitable for browsing on the image forming apparatus 1-01 using the device information and the information management table 801.

In step S706, the virtual machine 1-07 issues a web content acquisition request to the URL information contained in the rendering request received in step S702. The web content acquisition request notifies information designating the user agent specified in step S705.

In step S717, the webpage server 1-05 determines whether a web content acquisition request is received from the virtual machine 1-07. In a case where the webpage server 1-05 determines that no web content acquisition request is received (NO in step S717), the processing returns to step S717, and the webpage server 1-05 repeats the processing.

In a case where the webpage server 1-05 determines that a web content acquisition request is received (YES in step S717), the processing proceeds to step S718.

In step S718, the webpage server 1-05 transmits, to the virtual machine 1-07, web content corresponding to the user agent contained in the web content acquisition request, and the process is ended.

For example, in a case where a user agent corresponding to 120×200 (pixels) screen size information (screen resolution information) is used as the user agent in the web content acquisition request, web content with a display size, a text size, a resolution, and a layout that are suitable for the 120×200 screen size information is acquired. In a case where a user agent corresponding to 400×240 screen size information is used as the user agent in the web content acquisition request, web content with a display size, a text size, a resolution, and a layout that are suitable for the 400×240 screen size information is acquired.

The display size of the web content that is acquired using the user agent corresponding to the 400×240 screen size information is greater than the display size of the web content that is acquired using the user agent corresponding to the 120×200 screen size information.

The text size of the web content that is acquired using the user agent corresponding to the 400×240 screen size information is greater than the text size of the web content that is acquired using the user agent corresponding to the 120×200 screen size information. The resolution of the web content that is acquired using the user agent corresponding to the 400×240 screen size information is higher than the resolution of the web content that is acquired using the user agent corresponding to the 120×200 screen size information. The layout of the web content that is acquired using the user agent corresponding to the 400×240 screen size information is different from the layout of the web content that is acquired using the user agent corresponding to the 120×200 screen size information.

In step S707, the virtual machine 1-07 acquires the web content from the webpage server 1-05, and the processing proceeds to step S708.

In step S708, the virtual machine 1-07 performs rendering based on the acquired web content.

In step S709, the virtual machine 1-07 generates a rendering result image and stores the generated image. In step S710, the virtual machine 1-07 notifies the browser control unit 3-60 of URL information indicating a storage location of the rendering result image.

In step S713, the browser control unit 3-60 determines whether URL information indicating a storage location of a rendering result image is received from the virtual machine 1-07. In a case where the browser control unit 3-60 determines that no URL information indicating a storage location of a rendering result image is received (NO in step S713), the processing returns to step S713, and the browser control unit 3-60 repeats the processing. In a case where the browser control unit 3-60 determines that URL information indicating a storage location of a rendering result image is received (YES in step S713), the processing proceeds to step S714.

In step S714, the browser control unit 3-60 issues an image data acquisition request to the virtual machine 1-07.

In step S711, the virtual machine 1-07 determines whether an image data acquisition request is received from the browser control unit 3-60. In a case where the virtual machine 1-07 determines that no image data acquisition request is received (NO in step S711), the processing returns to step S711, and the virtual machine 1-07 repeats the processing. In a case where the virtual machine 1-07 determines that an image data acquisition request is received (YES in step S711), the processing proceeds to step S712.

In step S712, the virtual machine 1-07 transmits the image data to the browser control unit 3-60, and the process is ended.

In step S715, the browser control unit 3-60 determines whether image data is received from the virtual machine 1-07. In a case where the browser control unit 3-60 determines that no image data is received (NO in step S715), the processing returns to step S715, and the browser control unit 3-60 repeats the processing. In a case where the browser control unit 3-60 determines that image data is received (YES in step S715), the processing proceeds to step S716.

In step S716, the browser control unit 3-60 displays the received image data on the display of the operation unit 3-12, and the process is ended.

Other Exemplary Embodiments

The present disclosure is not limited to the above-described exemplary embodiments, and various modifications (including organic combinations of the exemplary embodiments) can be made based on the spirit of the present disclosure and are not excluded from the scope of the present disclosure.

The present disclosure can be implemented also by a process in which a program for implementing one or more functions of the exemplary embodiments is supplied to a system or an apparatus via a network or a storage medium and one or more processors of a computer of the system or the apparatus read the program and execute the read program. Further, the present disclosure can be realized also by a circuit (e.g., application-specific integrated circuit (ASIC)) that realizes the one or more functions.

The present disclosure is applicable to a system formed by a plurality of devices or an apparatus formed by a single device. For example, a function can be implemented by configuring an external server to perform part of the software modules and acquiring results of processing performed by the external server.

While device information is described as an example of information for specifying a user agent according to the second exemplary embodiment, information that is transmitted from the image forming apparatus 1-01 to the virtual machine 1-07 can be the user agent.

Features of the first and second exemplary embodiments can be combined. Specifically, web content is acquired using a user agent corresponding to the screen size of the image forming apparatus 1-01, and the acquired web content is rendered using a condition corresponding to the screen size.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-145033, filed Sep. 13, 2022, which is hereby incorporated by reference herein in its entirety.

What is claimed is:

1. A web browsing system comprising a server and a communication terminal, wherein the communication terminal comprising:

one or more memories storing first instructions, and one or more processors which, when executing the first instructions, cause the communication terminal to:

transmit, to the server, address information of a webpage and specification information for specifying a user agent corresponding to the communication terminal, and wherein the server comprising:

one or more memories storing second instructions; and one or more processors which, when executing the second instructions, cause the server to:

receive the address information and the specification information from the communication terminal;

specify the user agent based on the specification information;

access the webpage based on the address information and the user agent;

generate and store a render image from the webpage; and notify the communication terminal of URL information indicating a storage location of the render image, and wherein the communication terminal, in a case where the communication terminal receives the render image from the storage location in response to a request using the notified URL information, displays the webpage based on the received render image.

2. The web browsing system according to claim 1, wherein the specification information is screen size information of the communication terminal.

3. The web browsing system according to claim 1, wherein the specification information is identification information of a display device of the communication terminal.

4. The web browsing system according to claim 1, wherein the specification information is identification information of the communication terminal.

5. The web browsing system according to claim 1, further comprising another communication terminal configured to communicate with the server and display the webpage, wherein a screen size of the result of the rendering of the webpage that is transmitted from the server to the other communication terminal is greater than a screen size of the result of the rendering of the webpage that is transmitted from the server to the communication terminal.

6. The web browsing system according to claim 1, further comprising another communication terminal configured to communicate with the server and display the webpage, wherein text of the result of the rendering of the webpage that is transmitted from the server to the other communication terminal is larger than text of the result of the rendering of the webpage that is transmitted from the server to the communication terminal.

7. The web browsing system according to claim 1, further comprising another communication terminal configured to communicate with the server and display the webpage, wherein a resolution of the result of the rendering of the webpage that is transmitted from the server to the other communication terminal is higher than a resolution of the result of the rendering of the webpage that is transmitted from the server to the communication terminal.

8. The web browsing system according to claim 1, further comprising another communication terminal configured to communicate with the server and display the webpage, wherein a layout of the result of the rendering of the webpage that is transmitted from the server to the other communication terminal is different from a layout of the result of the rendering of the webpage that is transmitted from the server to the communication terminal.

9. The web browsing system according to claim 1, wherein the communication terminal is an image forming apparatus configured to form an image on a sheet.

10. The web browsing system according to claim 1, wherein the communication terminal is an image scanning apparatus configured to scan an image from a document.

11. A method for a web browsing system comprising a server and a communication terminal, the method comprising:

transmitting, by the communication terminal and to the server, address information of a webpage and specification information for specifying a user agent corresponding to the communication terminal;

specifying, by the server, the user agent based on the specification information;

accessing, by the server, the webpage based on the address information and the user agent;

generating and store, by the server, a render image from the webpage; and notifying, by the server, the communication terminal of URL information indicating a storage location of the render image, wherein the communication terminal, in a case where the communication terminal receives the render image from the storage location in response to a request using the notified URL information, displays the webpage based on the received render image.

* * * * *